April 14, 1925.
H. C. T. EGGERS
1,533,105
ELECTRIC SIGNALING
Filed Jan. 5, 1920
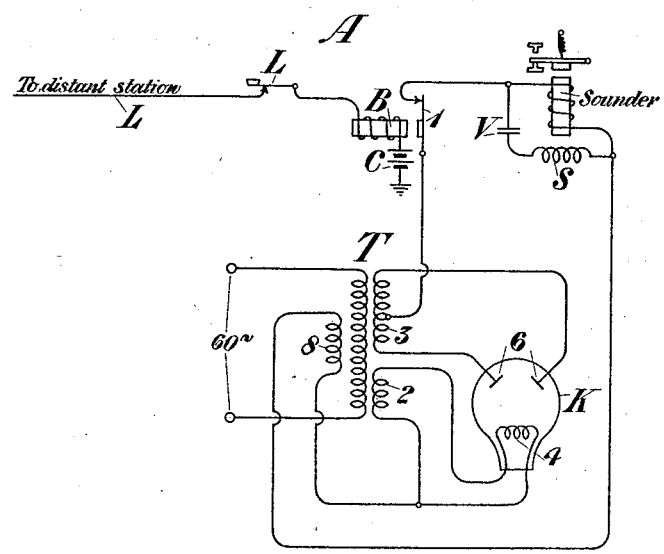
INVENTOR.
*H.C.T. Eggers*
BY
ATTORNEY Patented Apr. 14, 1925.

1,533,105

UNITED STATES PATENT OFFICE.

HENRY C. T. EGGERS, OF MINNEAPOLIS, MINNESOTA, ASSIGNOR TO AMERICAN TELEPHONE AND TELEGRAPH COMPANY, A CORPORATION OF NEW YORK.

ELECTRIC SIGNALING.

Application filed January 5, 1920. Serial No. 349,518.

*To all whom it may concern:*

Be it known that I, HENRY C. T. EGGERS, residing at Minneapolis, in the county of Hennepin and State of Minnesota, have invented certain Improvements in Electric Signaling, of which the following is a specification.

This invention relates to electric signaling and is described herein with particular reference to operating circuits for telegraph sounders.

In telegraph practice it is frequently desirable to utilize a rectified alternating current for operating sounders, in order to save the expense of storage batteries. Such arrangements have heretofore, however, given unsatisfactory operation of the sounders, because of the fluctuating character of the rectified current, the sounder blows not being uniform in loudness, but strong or weak according to the value of the voltage at the instant the sounder circuit is closed. The object of the present invention is to secure uniform response of the sounder, or other electromagnetic device, when operated by rectified current.

This object is attained by separating the fluctuating current into two components—one, a substantially uniform direct current and the other, a variable current,—and operating the sounder by the direct current alone.

The above object of the invention and certain other features thereof set forth hereinafter, are attained by certain methods and combinations of elements described in the following specification which has reference to a specific form of embodiment of the invention illustrated in diagrammatic view in the accompanying drawing.

In this drawing, reference character L designates a telegraph line which extends from a station A to a distant station not shown in the drawing. At station A the line leads through a telegraph key L, a relay B and a battery C to ground, the line being grounded through similar apparatus at the distant station. Operation of the key L causes the relay B to open and close its contact 1, which governs the circuit of a telegraph sounder. This circuit comprises a rectifier which is associated with a source of alternating current shown in the drawing as having a frequency of 60 cycles, it being understood, however, that this frequency is merely illustrative and that any other suitable frequency may be used. Associated with this source is a transformer T, the secondary of which comprises two separate windings, designated 2 and 3, the former of which supplies current to the filamentary cathode 4 of a rectifying device K and the latter of which furnishes potential to the anode 6 thereof. The construction and operation of a rectifier of this type is well known in the art and need not be further explained. It is to be understood, however, that this form of rectifier is shown merely for the sake of illustration and that any other suitable rectifying device may be used. The output circuit of the rectifier extends from the filament 4 through a reactance coil 8 which is magnetically linked with the windings of transformer T, through the winding of the telegraph sounder, through the contact 1 of relay B to the midpoint of the winding 3 of transformer T. If this circuit were non-inductive the current therein would pass through a cycle from zero to maximum and back to zero for each half of the complete alternating current wave; in other words, the current would pulsate from zero to a maximum at a frequency of 120 cycles per second. The coil 8 renders the circuit inductive and serves, thus, to smooth out the current wave so that the same does not reach zero, but fluctuates with a periodicity of 120 cycles per second between a maximum value dependent upon the maximum value of the alternating voltage and a minimum value greater than zero. This current is substantially equivalent to a direct current of uniform value having superimposed thereon an alternating current of 120 cycles. The alternating component of 120 cycle frequency is shunted around the sounder by means of a condenser V and a coil S which are resonant at 120 cycles, and bridged across the terminals of the sounder. The sounder is operated therefore by the direct current component alone. This current is of substantially uniform strength and causes consequently a uniform response of the sounder no matter at what instant the contact 1 is closed. In case it is found that there are prominent irregularities in the current wave of other frequencies, they may be shunted out in a similar manner by other resonant shunts associated with the sounder.

Although I have here shown and described only one method and only one form and arrangement of apparatus embodying the invention, it is readily understood that various changes and modifications may be made therein within the scope of the following claims without departing from the spirit and scope of the invention.

What I claim is:

1. In combination, a telegraph sounder, a source of alternating current of a certain frequency, a device for rectifying the same, an output circuit therefor including said sounder, and means bridged across said sounder for rendering the same non-responsive to alternating current, said means being resonant to a frequency double that of said source.

2. In combination, an electromagnetic translating device, a source of alternating current, means for operating said device by energy from said source, said means comprising a rectifier, an output circuit therefor including said device and means resonant at twice the frequency of the alternating current source to render said device non-responsive to alternating current of said double frequency.

3. In combination, a telegraph line, a relay responsive to current therein, a sounder responsive to said relay, a source of alternating current for operating the sounder, a rectifier interposed between the said source and the sounder, and a shunt about said sounder resonant at twice the frequency of the said source.

4. The method of operating a translating device responsive to direct current by energy from a source of alternating current, which consists in rectifying said alternating current, separating the resultant pulsating current into a uni-directional component of substantially uniform value and a double frequency component, and rendering the first-mentioned component effective and by-passing said second-mentioned component in a shunt tuned to said double frequency.

5. The method of operating a telegraph sounder by current from an alternating current source, which consists in rectifying said current, passing the same through an inductance element partially to smooth out the rectified wave, passing the uni-directional component of said wave through the sounder and shunting the alternating component thereof about the sounder.

6. In combination, a telegraph sounder, a source of alternating current, a device for rectifying the same, an output circuit therefor including said sounder, an inductance coil in series with said sounder in said output circuit and a resonant shunt bridged across said sounder.

In testimony whereof, I have signed my name to this specification this 29th day of December, 1919.

HENRY C. T. EGGERS.